United States Patent
Moore et al.

(10) Patent No.: US 9,613,334 B2
(45) Date of Patent: Apr. 4, 2017

(54) MOBILE PICKING METHOD

(71) Applicants: Dale A. Moore, Cedar Springs, MI (US); Stephen E. Hoffman, Grand Rapids, MI (US)

(72) Inventors: Dale A. Moore, Cedar Springs, MI (US); Stephen E. Hoffman, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 180 days.

(21) Appl. No.: 14/212,315

(22) Filed: Mar. 14, 2014

(65) Prior Publication Data

US 2014/0336814 A1 Nov. 13, 2014

Related U.S. Application Data (60) Provisional application No. 61/820,891, filed on May 8, 2013.

(51) Int. Cl.
 G06F 7/00 (2006.01)
 G06Q 10/08 (2012.01)
 G06Q 50/28 (2012.01)
 G06Q 10/04 (2012.01)

(52) U.S. Cl.
 CPC ......... *G06Q 10/087* (2013.01); *G06Q 10/047* (2013.01); *G06Q 10/0833* (2013.01); *G06Q 10/0875* (2013.01); *G06Q 50/28* (2013.01)

(58) Field of Classification Search
 None
 See application file for complete search history.

(56) References Cited

U.S. PATENT DOCUMENTS

| | | | |
|---|---|---|---|
| 7,295,114 B1 | 11/2007 | Drzaic et al. | |
| 7,504,949 B1 | 3/2009 | Rouaix et al. | |
| 7,580,699 B1* | 8/2009 | Shaw | G06Q 20/102 455/410 |
| 8,311,902 B2 | 11/2012 | Mountz et al. | |
| 8,433,437 B1 | 4/2013 | Shakes et al. | |
| 8,571,702 B1 | 10/2013 | Haake et al. | |
| 2003/0233165 A1 | 12/2003 | Hein et al. | |

(Continued)

FOREIGN PATENT DOCUMENTS

EP 2503487 A2 9/2012

OTHER PUBLICATIONS

International Search Report (Form PCT/ISA/210) and Written Opinion of the International Searching Authority (Form PCT/ISA/237) from corresponding Patent Cooperation Treaty Application No. PCT/US2014/028281, mailed Aug. 1, 2014.

(Continued)

*Primary Examiner* — Yolanda Cumbess
(74) *Attorney, Agent, or Firm* — Gardner, Linn, Burkhart & Flory, LLP (57) ABSTRACT

A picking method includes having in a mobile device data and an application running on the mobile device. An order made up of a number of items to be picked from the warehouse is communicated from a host to a client application of the mobile device. The mobile device provides instructions of a sequence of locations to pick and the items to be picked at each location without further communications from the host. A corresponding picking system is provided.

26 Claims, 4 Drawing Sheets

(56) References Cited

U.S. PATENT DOCUMENTS

| | | | |
|---|---|---|---|
| 2004/0138781 A1* | 7/2004 | Sacks | G06Q 10/087 700/245 |
| 2004/0181467 A1* | 9/2004 | Raiyani | G06Q 10/087 705/28 |
| 2007/0080930 A1 | 4/2007 | Logan et al. | |
| 2012/0127976 A1 | 5/2012 | Lin et al. | |
| 2013/0096735 A1* | 4/2013 | Byford | G05D 1/0231 701/2 |
| 2013/0173049 A1 | 7/2013 | Brunner et al. | |
| 2013/0317642 A1* | 11/2013 | Asaria | G06Q 50/28 700/216 |
| 2014/0061294 A1* | 3/2014 | Kempf | G06Q 10/06 235/375 |
| 2015/0019391 A1* | 1/2015 | Kumar | G06Q 10/087 705/28 |
| 2015/0039461 A1* | 2/2015 | Gadre | G06Q 30/0639 705/26.7 |

OTHER PUBLICATIONS

International Preliminary Report on Patentability from corresponding Patent Cooperation Treaty Patent Application No. PCT/US2014/028281 mailed Nov. 19, 2015.

* cited by examiner

MOBILE PICKING METHOD

CROSS REFERENCE TO RELATED APPLICATION

This application claims priority to U.S. provisional patent application Ser. No. 61/820,891 filed May 8, 2013, the disclosure of which is hereby incorporated herein by reference in its entirety.

BACKGROUND OF THE INVENTION

The present invention is directed to a picking method and system and, in particular, to such method and system that does not require wireless network capabilities throughout a warehouse. The invention has application in order fulfillment and manufacturing kitting operations. Other applications may be apparent to the skilled artisan.

Warehouse picking using mobile devices provide picking locations to an operator and a number of locations that are to be picked at the location. Once the items are picked, a next location is communicated to an operator, such as by voice commands, visual commands, or the like. Such systems require expensive hardware installations and secure data connectivity which increases proportionately with the size of the installations and the number of mobile picking devices being used.

SUMMARY OF THE INVENTION

The present invention provides a mobile picking method, and system for use in carrying out the method, that is fast and effective. Because it can be utilized without an extensive expenditure for hardware purchase and installation, it can be adapted to a wide variety of installations. Also, it provides a technique for electronic isolation of the picking operation from the warehouse management system thus facilitating communication without allowing the supplier of the picking operation having access to the data on the warehouse management system server.

A picking method, according to an aspect of the invention, includes having a mobile device data that defines a layout of items in a warehouse. An order made up of a number of items to be picked from the warehouse is communicated from a host to a client application of the handheld device. The handheld device provides instructions of a sequence of locations to pick and the items to be picked at each location without further communications from the host. A corresponding system is provided.

Information on the picking sequence of items for the order to be picked in the warehouse may be communicated with the order information. The communication may be repeated a plurality of times, each for a different order, and an application at the mobile device may establish a combined sequence of locations to be picked and the items to be picked at each location of the plurality of orders. The application running on the mobile device may identify to the operator at each location a number of items to be picked and in which order receptacle to place each of the items to be picked. The application running on the mobile device may display an optical depiction of the item to be picked at a location. The application in the mobile device may confirm that each of the items is picked and matched with the order containing that item before instructing the operator to move to another location in the warehouse. The application running on the mobile device may confirm that each of the items is matched with the order containing that item in response to the mobile device scanning a code of a receptacle associated with that order.

The data that defines a layout of items in the warehouse may be developed by the host and separately communicated by the host to the mobile device. The communication between the host system and the mobile device may be the production of an optical pattern with the host and scanning of the optical pattern with an optical scanner associated with the mobile device. The optical pattern may be a Quick Response code. A Bluetooth connection may be used between the optical scanner and the mobile device. The communication between the host system and the mobile device may be a wireless communication. The wireless communication may be from an HTTP server or a web server.

The application running on the mobile device may produce an image of an item to be picked at a location. Scanning of a location code may be confirmed by the application in the mobile device in order to confirm that the orders have been picked. A Smart Watch worn by the operator may be in communication with the mobile device for providing a user interface with said mobile device.

These and other objects, advantages and features of this invention will become apparent upon review of the following specification in conjunction with the drawings.

DESCRIPTION OF THE PREFERRED EMBODIMENT

Figure 1:
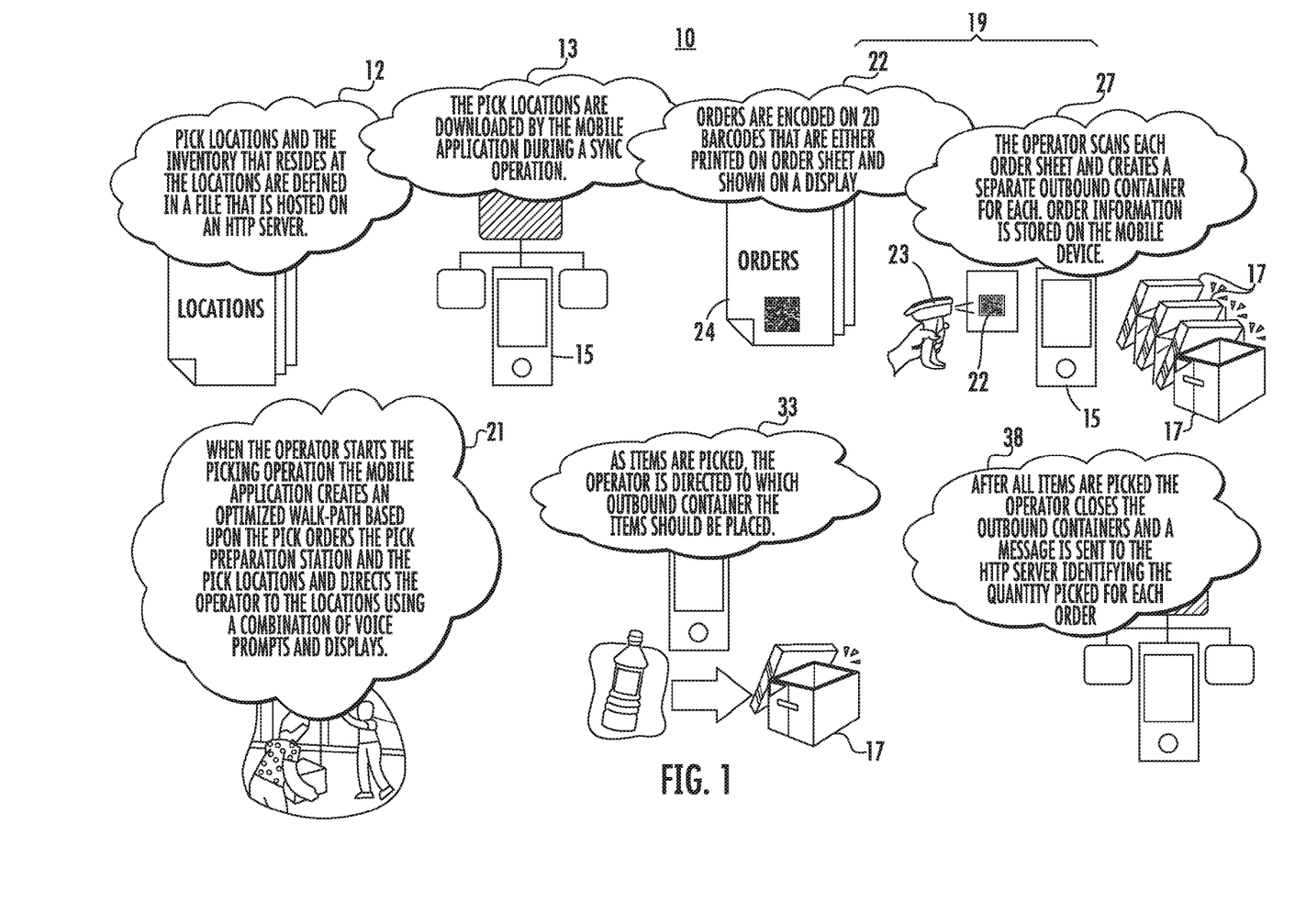
FIG. 1 is a block diagram illustrating steps of a picking method, according to an embodiment of the invention.

Referring now to the drawings and the illustrative embodiments depicted therein, a mobile picking method 10 includes item location data 12 defining warehouse pick locations. Such data 12 resides in a host system 14 and individually in one or more mobile devices, such as intelligent handheld devices 15. Devices 15 are illustrated as consumer grade devices, such as Smart Phones, tablets, or other personal digital assistants that are available from a wide variety of suppliers. Such data 12 may be downloaded from a host system 14, such as during a synchronizing function 13. Synchronizing function 13 may be performed either by electronic transfer such as over a WIFI network or may be performed by printing an optical image of the sequence of locations 12 that is read by the optical scanner 23 of mobile devices 15. The optical image may be a QR code, or the like. Sequence of locations data 12 may be omitted if sufficient location information is included with optical pattern 22. However, location data 12 provides additional information to optimize the pick path. Mobile picking method 10 involves the picking of multiple orders of items, such as for an order fulfillment operation, or for kits of components in a manufacturing operation.

Host 14 communicates at 19 to a client application running on mobile device 15 an order made up of a number of items to be picked from the warehouse. The handheld device provides instructing at 21 to an operator of a sequence of locations to pick and the items to be picked at each location, without further communication from host 14. Items are then picked at 33 according to a walk-path established by instructions 21 generated by the client application running on mobile device 15.

Figure 2:
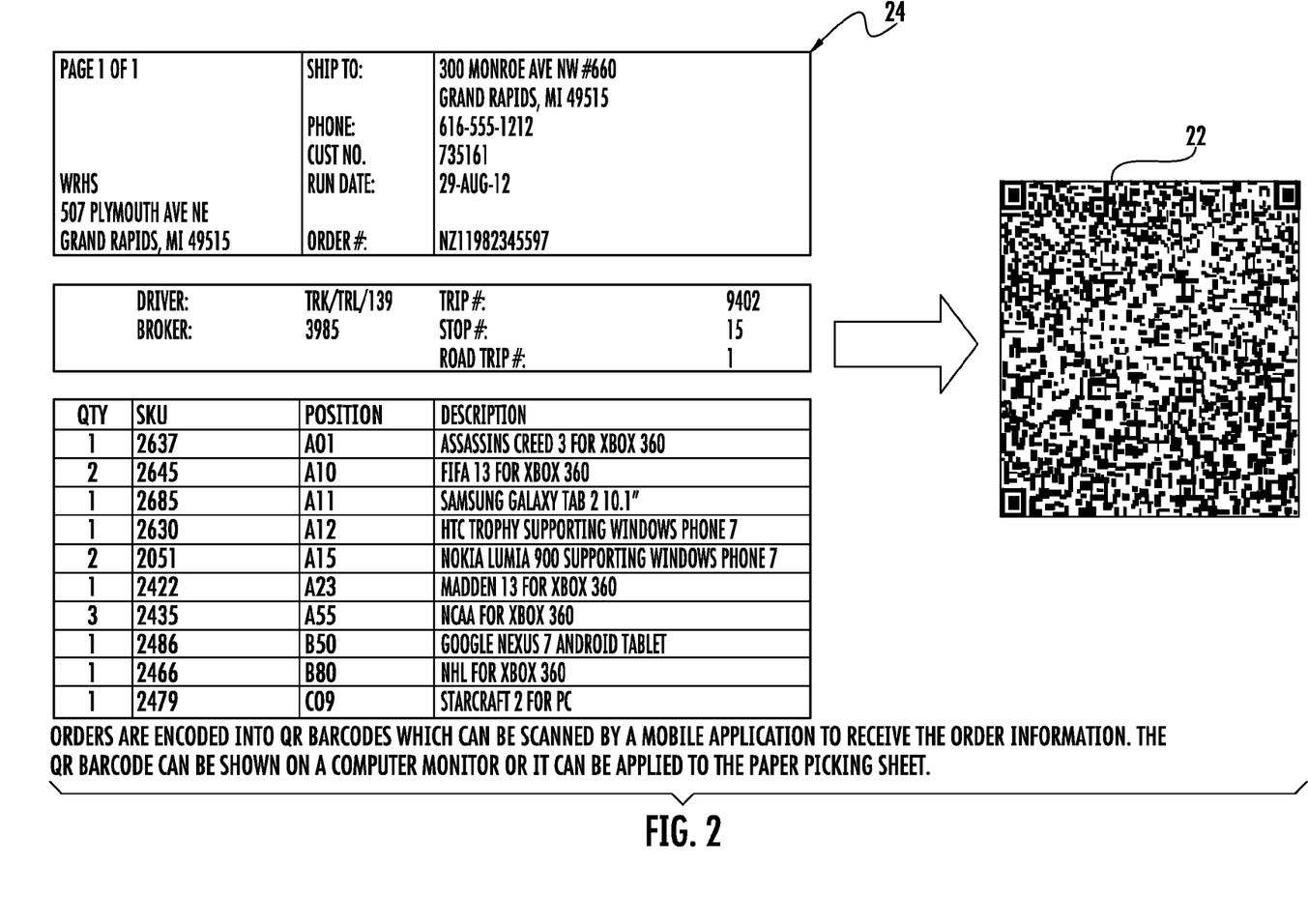
FIG. 2 is a data layout diagram illustrating pick sequence data contained on each order sheet and encoded into the associated optical code.
Figure 3:
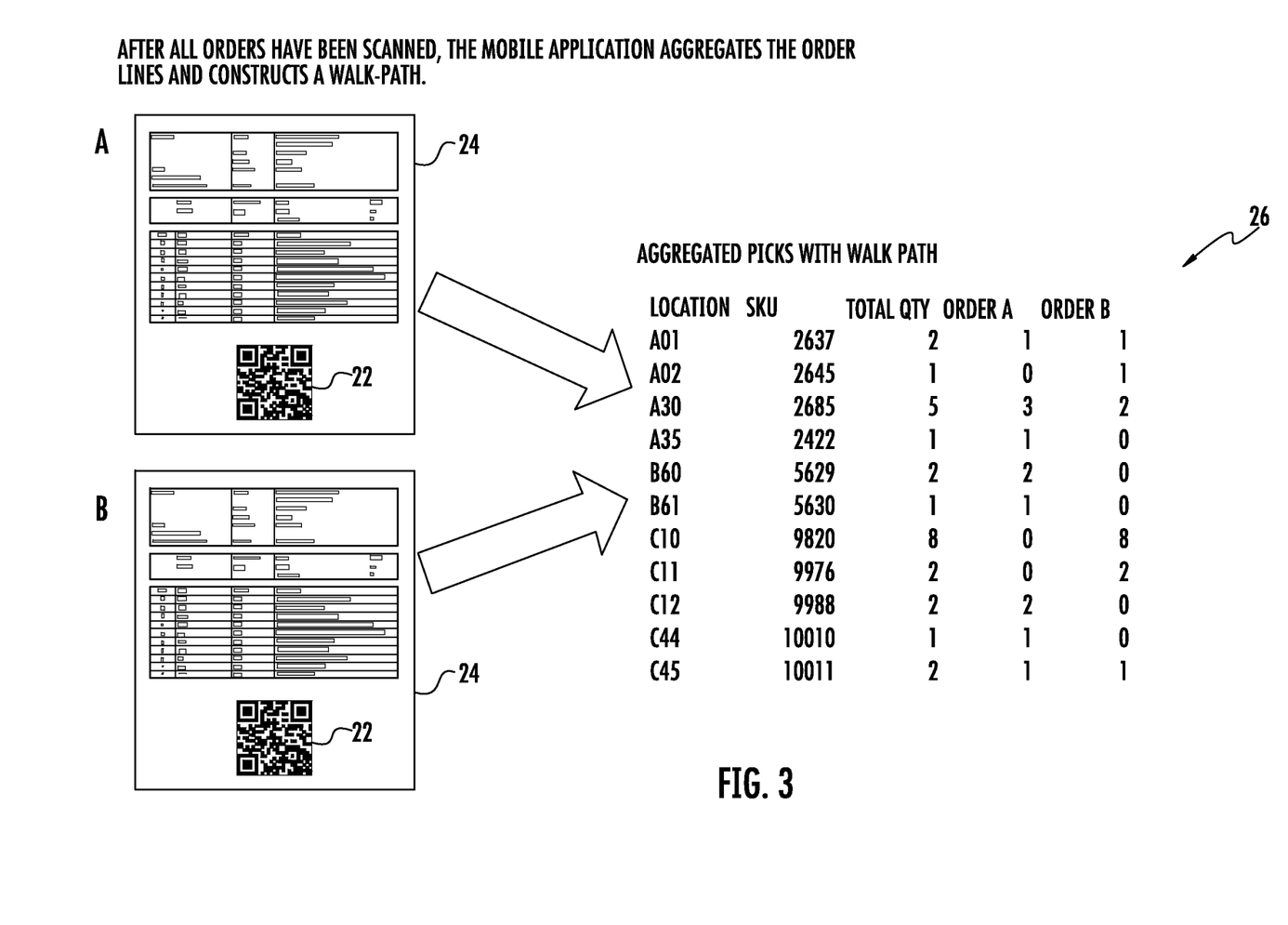
FIG. 3 is a data layout diagram illustrating the aggregation of data from multiple orders into a walk path plan.

In the illustrated embodiment, each order is encoded, such as by printing by host 14, at 22 on an order sheet 24 with an optical pattern. The optical pattern 22 is scanned at 27 with an optical scanner 23 associated with mobile device 15. Optical pattern 22 is a barcode, such as a two-dimensional barcode, such as a quick-response (QR) code. Optical pattern 22 includes information on an optimized picking sequence to minimize walking to pick the items for the order to be picked in the warehouse. The host 14 generates a large number of the order sheets throughout a working shift. An operator grabs a number of the order sheets 24 and scans the optical pattern 22 associated with the orders. The operator may create a separate order container 25 for each order sheet. The client application running on mobile device 15 aggregates the picking sequences at 26 for all of the scanned orders for that batch of orders and establishes an optimized walk-path based upon the aggregated pick sequences for the pick orders. Once a number of orders are aggregated by mobile device 15, pick operation 21 commences at 27 for the first order in that batch. No communication between host 14 and the pick device(s) 15 is required during the pick 21. The mobile device identifies to the operator a sequence of locations throughout the warehouse and at each warehouse location a number of items to be picked and in which of the orders each of the item(s) is to be placed.

Figure 4:
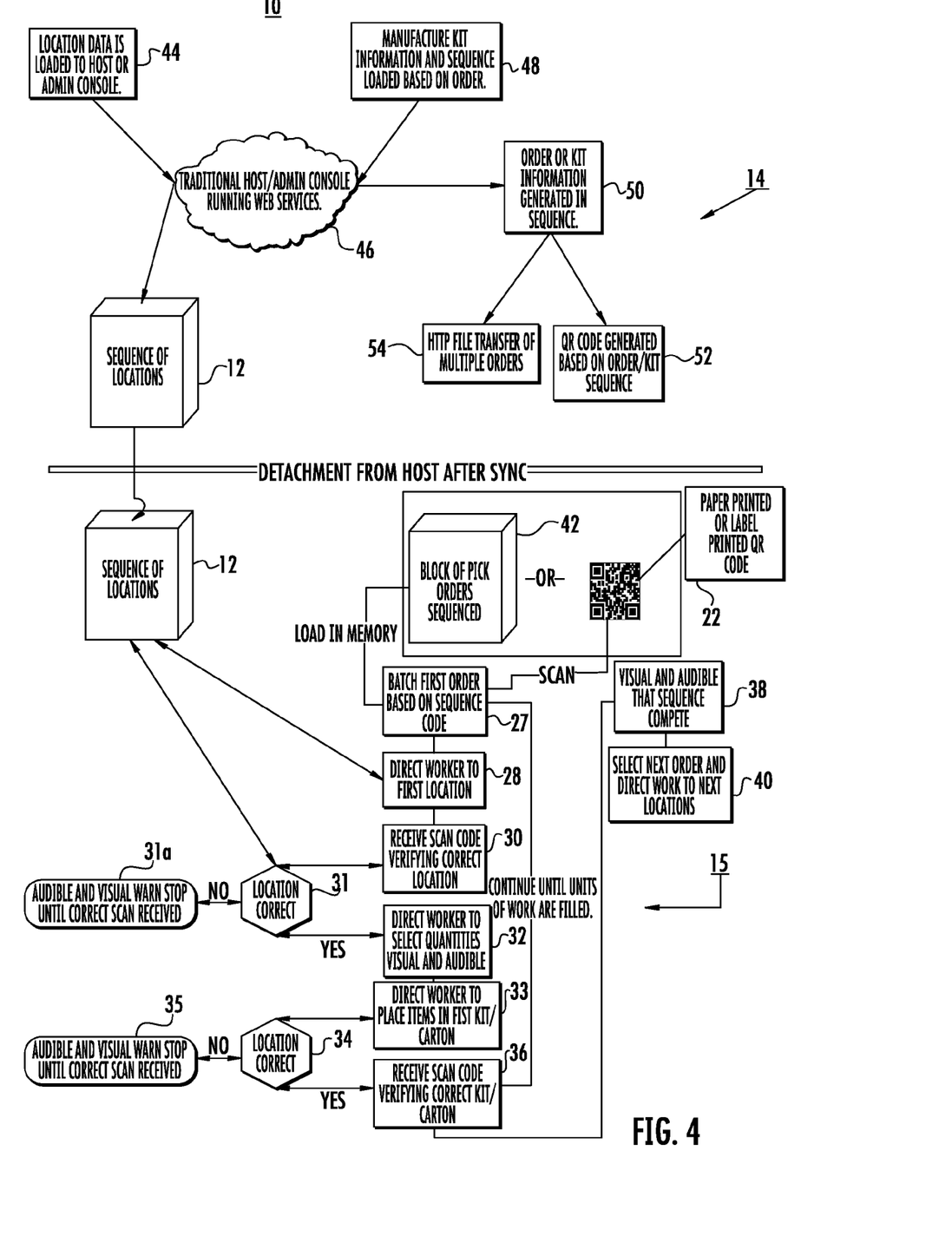
FIG. 4 is a flow diagram of a method carried out by a host system and mobile devices, according to an embodiment of the invention.

Picking 21 begins by the mobile application directing the operator to a first location at 28, such as by voice commands, visual commands, or both. The mobile application consults layout data file 12 present on that mobile device. The mobile device informs the operator of the number of items to be picked at that location. Optionally, mobile device 15 may display an image of the object to be picked. This ability to display an image of the object could be especially useful in certain manufacturing kit picking in which items, such as wiring harnesses, may differ for each other by minor characteristics, such as a color of electrical connectors, or the like. When arriving at the location, the operator scans a code at 30, such as a one- or two-dimensional barcode, at the location, such as with optical scanner 23. It is determined at 31 whether the scanned code matches the desired location. If not at the correct location, an audible and/or visual signal is given by mobile device at 31a and the picking cannot proceed until the correct location is accessed. The operator then picks a first item at 32 and is directed by mobile device 15 to place the first item picked in the designated order receptacle at 33. The operator than scans a code, such as a barcode, on the receptacle 17 in order to verify at 34 that the correct item is being placed in the receptacle. If is determined at 34 that the operator scans the incorrect warehouse location code at 33, an audible and/or visual warning is given at 35.

Picking cannot proceed until it is determined at 34 that the proper location code is received for each item to be picked at that location. The operator then scans the receptacle code at 36 into which the item is placed indicating that the item was placed in the correct receptacle. Steps 33 through 36 are repeated for each item picked at that location. Thus, method 10 provides for very secure verification of proper picking by multiple levels of security that (1) the proper location is being accessed by scanning the code at the location (once for each item picked) and visually identifying an image of the object displayed by mobile device 15 and (2) verifying that the proper order receptacle(s) 17 has received the picked item. It is not until these multiple levels of verification are completed that the operator is instructed to access the next picking location 28 along the walking route established by the application running on mobile device 15. The operator repeats steps 28 through 36 for all pick locations 28 for all items in an order sheet 25 that was scanned by the operator. An operator may grab enough order sheets 24 for the shift and scan enough codes for the number of order receptacles 17 that the picking cart (not shown) is capable of handling.

When the operator has been instructed at 27 through 36 of all of the items to be picked for the first order, the operator is provided a visual and/or audible indication at 38 that the order is complete and the worker is provided at 40 with instructions to the locations for the next order to be completed. It should be understood that the orders represented by the order sheets 24 scanned by the operator at one time are combined into aggregate 26. For example, when two or more orders require picking at the same warehouse location, the operator needs to visit that location only once and be provided with instructions by mobile device 15 with instructions for pick items for all of the orders being picked at that time by the operator. This combination of order into an aggregate picking sequence 26 is performed by the application on mobile device 15 from the picking sequence data generated by host system 14 and communicated to mobile device 15 for that batch of orders from the sequence listed in the optical code 22 on the respective order sheet 24. The picking is then guided by data 12 of picking locations that is downloaded by host system 14 to the mobile devices 15 during a sync operation 13 performed only once a day, or the like, to correspond with changes made to warehouse locations. However, each order can be updated up to the time of it being picked by generating a new order sheet 25. This facilitates flexible manufacturing by allowing an object being manufactured to be modified even once manufacturing has begun. When an entire batch or batches of orders have been picked, the mobile device 15 may optionally again be synced with host system 14 to confirm the completion of the orders or to report deficiencies, or the like. This is especially useful in order fulfillment operations.

The above description is for the use of optical code to be used to download order information to mobile device 15 by way of a printer associated with host system 14 and optical scanner 23 on each mobile device 15. Other technology may be used to download orders to the operator while still allowing items to be picked 21 at each location 28 in the absence of a communication link. For example, a block of pick orders 42 may be communicated to handheld devices 15 using localized RF communication, such as a WIFI connection, or the like. This avoids the need for the WIFI range to be extended throughout the warehouse, but utilize the presence of WIFI service in a centralized order staging function in the warehouse. The orders may be individually communicated to the mobile device in the same fashion as with optical codes 22. Alternatively, host system 14 may download aggregate picking sequence 26 for an entire batch picking of a number of orders because of the greater data handling capability of the WIFI connection. Alternatively, an RFID chip may be provided with order sheet 24 to download the order data with each order sheet and scanned with an RFID scanner of the mobile device 15.

Host system 14 generates and maintains data 12 defining pick locations in the warehouse from various sources of inventory information as is known in the art, such as by loading 44 from an administration counsel to a warehouse management system 46. Order data may be entered at 48 from various known order placement sources. Warehouse management system 46 generates data at 50 for individual order sheets 24 including an optimized picking sequence, the items to be picked for that order and the quantity of each order. The optical codes 22 are created at 52 for printing by a printer (not shown) to order sheets 24. Alternatively, data files may be supplied at 54 to an HTTP or a web server for communicating to mobile devices 15 by WIFI communication, or the like.

Alternatively, a Smart Watch, of the known type that is commercially available from several manufacturers, may be in communication with the mobile device. With a Smart Watch, the mobile device no longer needs to be attached to/carried by the operator. Instead, the mobile device could be attached to the cart which is used to transport the order containers that are being processed. In addition to the system providing commands to the operator via voice or visual (on the mobile device), commands may also delivered visually to the operator via the Smart Watch worn on the operators wrist.

With the addition of a Smart Watch into the system, the operator receives information pertaining to, but not limited to:

Warehouse location to visit
Quantity to be processed at the location
Description of the product to be processed
In addition to having information delivered to the operator via the Smart Watch, the operator can also interact with the system. This interaction includes, but is not limited to:
Confirming location
Confirming pick
Changing quantities While the operator is scanning each order sheet at 27, information is sent to the Smart Watch to help direct the operator as to what to do next. Once picking 21 begins, the operator is directed to the first location at 28 by information displayed on the Smart Watch. The Smart Watch informs the operator of the number of items to be picked at the location. Upon arriving at the location, the operator scans a code at 30 to confirm the correct location. If the location identified is incorrect, the operator is informed via the Smart Watch that they are not at the correct location. If the location identified is correct, the operator picks the number of items identified on the Smart Watch and confirms the pick via buttons on the Smart Watch at 32. The operator is then directed by the Smart Watch to place the item picked in the designated order receptacle at 33. The operator then scans the receptacle to verify that they placed the product into the proper receptacle. If it is determined at 34 that the operator scanned the incorrect receptacle, the operator is informed via the Smart Watch. The picking process continues with information being delivered to the operator on the Smart Watch.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A picking method, comprising:
having a host computer with an output and a mobile device with an application program running on the mobile device;
the host computer communicating with the mobile device thereby providing data defining the item or items of a plurality of orders, the data defining each order being provided individually using the output, at least some of the orders comprising a plurality of items in that order, the mobile device having an input receiving the data provided by the host computer defining the item or items for each order, the data defining each order being received individually and loading that data to the application program running on the mobile device, the application program providing data defining the items to be picked from the warehouse for the plurality of orders;
the host computer discontinuing communication with the mobile device and an operator then picking items from the warehouse in response to said mobile device providing instructions from the application program of a sequence of locations to pick and the items to be picked at each location for the plurality of orders; and
the host computer resuming communication with the mobile device and the application program on the mobile device communicating data to the host computer after the picking of the items for the plurality of orders in order to confirm that the items for the orders have been picked.

2. The method as claimed in claim 1 wherein the data also defines a layout of items in the warehouse that is developed by the host and separately communicated by the host to the mobile device and information on picking sequence of items for the order to be picked in the warehouse.

3. The method as claimed in claim 1 including data that defines a layout of items in the warehouse that is developed by the host and separately communicated by the host to the mobile device.

4. The method as claimed in claim 1 wherein said communicating comprises a wireless communication.

5. The method as claimed in claim 1 wherein the application program displaying with a mobile device an image of an item to be picked at a location.

6. The method as claimed in claim 5 wherein images of items to be picked are obtained during prior picking operations.

7. The method as claimed in claim 1 including a Smart Watch in communication with the mobile device for providing a user interface with said mobile device.

8. A picking method, comprising:
having a host computer with an output and a mobile device with an application program running on the mobile device;
the host computer communicating with the mobile device thereby providing data defining the item or items of a plurality of orders, the data defining each order being provided individually using the output, at least some of the orders comprising a plurality of items in that order, the mobile device having an input receiving the data provided by the host computer defining the item or items for each order, the data defining each order being received individually and loading that data to the application program running on the mobile device, the application program providing data defining the items to be picked from the warehouse for the plurality of orders;

the host computer discontinuing communication with the mobile device, said mobile device establishing with an application program running on the mobile device an aggregate sequence of items to be picked, and locations of the items of the plurality of orders, wherein an operator then picking items from the warehouse in response to said mobile device providing instructions from the application program of a sequence of locations to pick and the items to be picked at each location for the plurality of orders.

9. The method as claimed in claim 8 wherein the application program running on the mobile device identifies to the operator at each location a number of items to be picked and in which order to place each of the items to be picked.

10. The method as claimed in claim 9 wherein the application program running on the mobile device identifies the number of items to be picked in response to a handheld scanner scanning a code at the location.

11. The method as claimed in claim 10 wherein the application program running on the mobile device confirms that each of the items is matched with the order containing that item before instructing the operator to move to another location in the warehouse.

12. The method as claimed in claim 11 wherein the application program running on the mobile device confirms that each of the items is matched with the order containing that item in response to the mobile device scanning a code of a receptacle associated with that order.

13. A picking method, comprising:
having a host computer with an output and a mobile device with an application program running on the mobile device;
the host computer communicating with the mobile device thereby providing data defining the item or items of a plurality of orders, the data defining each order being provided individually using the output, at least some of the orders comprising a plurality of items in that order, the mobile device having an input receiving the data provided by the host computer defining the item or items for each order, the data defining each order being received individually and loading that data to the application program running on the mobile device, the application program providing data defining the items to be picked from the warehouse for the plurality of orders;
the host computer discontinuing communication with the mobile device and an operator then picking items from the warehouse in response to said mobile device providing instructing from the application program of a sequence of locations to pick and the items to be picked at each location for the plurality of orders; and
wherein said host computer communication with the mobile device thereby providing data comprises producing an optical pattern with the host output and said receiving data comprises scanning said optical pattern with an optical scanner defining said input associated with said mobile device.

14. The method as claimed by claim 13 wherein the optical pattern comprises a Quick Response (QR) code.

15. The method as claimed in claim 13 including a Bluetooth connection between said optical scanner and said handheld device.

16. A picking system, comprising:
a mobile device with an application program running on the mobile device and a host computer with an output and a communication link that is adapted to communicate data between the host computer output and the mobile device when the mobile device is synchronized with the host system;
the host computer configured to provide data via the communication link defining the item or items of a plurality of orders with the mobile device synchronized with the host system, the data defining each order being provided individually using the output, at least some of the orders comprising a plurality of items in that order, the mobile device having an input configured to receive the data provided by the host computer defining the item or items for each order, the data defining each order being received individually and loaded to the application program running on the mobile device, the application program configured to provide data defining an order made up of number of items to be picked from the warehouse and a sequence of picking of the items of that order;
wherein the application program running on said mobile device provides instructions to an operator of a sequence of locations to pick and the items to be picked at each location for the plurality of orders with the mobile device not synchronized with the hosting computer during picking of items; and;
wherein the application program running on the mobile device communicates data to the host via communication link after the picking of items with the mobile device synchronized with the host computer in order to confirm that the items for the orders have been picked.

17. The picking system as claimed in claim 16 wherein the application program running on the mobile device stores an aggregate sequence of items to be picked and locations of the items of the plurality of orders.

18. The picking system as claimed in claim 17 wherein the application program running on the mobile device identifies to the operator at each location a number of items to be picked and in which order to place each of the items to be picked.

19. The picking system as claimed in claim 18 including a handheld scanner and wherein the application program running on the mobile device identifies the number of items to be picked in response to a handheld scanner scanning a code at the location.

20. The picking system as claimed in claim 19 wherein the application program running on the mobile device confirms that each of the items is matched with the order containing that item before instructing the operator to move to another location in the warehouse.

21. The picking system as claimed in claim 20 wherein the application program running on the mobile device confirms that each of the items is matched with the order containing that item in response to the mobile device scanning a code of a receptacle associated with that order.

22. The picking system as claimed in claim 16 wherein said communicating link comprises a wireless communication.

23. The picking system as claimed in claim 16 including a Smart Watch in communication with the mobile device for providing a user interface with said mobile device.

24. A picking system, comprising:
a mobile device with an application program running on the mobile device and a host computer with an output and a communication link that is adapted to communicate data between the host computer output and the mobile device when the mobile device is synchronized with the host system;

the host computer configured to provide data via the communication link defining the item or items of a plurality of orders with the mobile device synchronizing with the host system, the data defining each order being provided individually using the output, at least some of the orders comprising a plurality of items in that order, the mobile device having an input configured to receive the data provided by the host computer defining the item or items for each order, the data defining each order being received individually and loaded to the application program running on the mobile device, the application program configured to provide data defining the items to be picked from the warehouse and a sequence of picking of the items for the plurality of orders;

wherein the application program running on said mobile device provides instructions to an operator of a sequence of locations to pick and the items to be picked at each location for the plurality of orders with the mobile device not synchronized with the host computer during picking of items; and wherein said communication link comprises said output adapted to produce an optical pattern and said input comprises an optical scanner associated with said mobile device adapted to scan the optical pattern.

25. The picking system as claimed by claim 24 wherein the optical pattern comprises a Quick Response (QR) code.

26. The picking system as claimed in claim 24 including a Bluetooth connection between said optical scanner and said handheld device.

\* \* \* \* \*

UNITED STATES PATENT AND TRADEMARK OFFICE
CERTIFICATE OF CORRECTION

PATENT NO.        : 9,613,334 B2                                  Page 1 of 1
APPLICATION NO.   : 14/212315
DATED             : April 4, 2017
INVENTOR(S)       : Moore et al.

It is certified that error appears in the above-identified patent and that said Letters Patent is hereby corrected as shown below:

In the Specification

Column 3
Line 20, "container 25" should be --container 17--

In the Claims

Column 7
Line 51, "communication" should be --communicating--

Column 8
Line 27, "hosting" should be --host--
Line 30, "host via communication" should be --host via the communication--

Column 9
Line 6, "synchronizing" should be --synchronized--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*